June 3, 1958      H. A. DE HEER      2,836,990

ACCELERATOR MEANS

Filed Feb. 20, 1956

INVENTOR.
Herbert E. DeHeer
BY
                 ATTORNEY

United States Patent Office 2,836,990
Patented June 3, 1958

2,836,990

ACCELERATOR MEANS

Herbert A. De Heer, Grand Haven, Mich.

Application February 20, 1956, Serial No. 566,675

3 Claims. (Cl. 74—513)

This application relates to a means operatively associated with an accelerator pedal of a motor vehicle for indicating the approximate speed at which the vehicle is traveling.

With the advent of high speed automobiles now being manufactured and sold, most states have adopted speed limits. These speed limits are usually different in towns and villages as compared to the open highway. These speed limits although serving a useful purpose in slowing down the overall traffic do create a hazard caused by the driver frequently glancing at his speedometer rather than giving his entire attention to the road.

An object of this invention is to provide a device which eliminates the necessity for looking down at the speedometer and thus diverting the attention of the driver.

Another object of this invention is to provide a means operatively associated with the accelerator of a motor vehicle for indicating to the driver the speed range in which the vehicle is traveling.

Still another object of this invention is to provide an accelerator operatively associated with a biasing means to give an indication to the operator of the particular speed at which the vehicle is traveling.

A further object of this invention is to provide an auxiliary pedal which is adapted to be mounted next to the accelerator pedal of a motor vehicle for indicating the speed range at which the vehicle is traveling.

Another object of this invention is to provide the above means adapted to be adjusted for different speed ranges.

Other objects of this invention will become obvious upon reading the following specification in conjunction with the accompanied drawings wherein.

Figure 1:
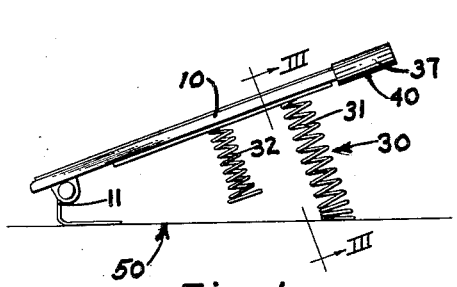
Fig. 1 is a side elevational view of an auxiliary accelerator pedal.

Figs. 5, 6, 7, and 8 illustrate a modified arrangement wherein the springs are connected directly to the main auxiliary pedal. These views illustrate the various speed positions.

Briefly, this invention is concerned with a pedal, either an auxiliary or a main accelerator pedal for a motor vehicle, such pedal being adapted to indicate to the driver the approximate speed range at which the vehicle is traveling. Basically the invention consists of spring means operatively associated with the accelerator pedal, said spring means being adapted to exert distinctly different upwardly biasing forces to the pedal at different positions of the pedal with respect to the floor. Thus, an operator of the vehicle can sense by the feel of the accelerator the vehicle's speed range which is dependent upon the position of the pedal.

In one modification of this invention an auxiliary pedal is provided which is adapted to be mounted next to the main accelerator pedal. In another modification the spring means is directly connected to the accelerator pedal thus requiring no auxiliary pedal.

Referring to the drawings, reference numeral 10 denotes an auxiliary pedal mounted along a main accelerator pedal 20. Both pedals are pivotally secured at one end through the floor 50—the pedal 10 by the bracket 11 and pedal 20 by bracket 21. Pedals 10 and 20 are operatively connected together by the actuating plate 37. The spring biasing means 30 provides the means for indicating to the driver the position of the two pedals and thus the approximate speed of the vehicle.

The auxiliary pedal 10 is a conventional accelerator pedal having a backing plate 12 embedded in and supporting the rubberized material 13.

Figure 3:
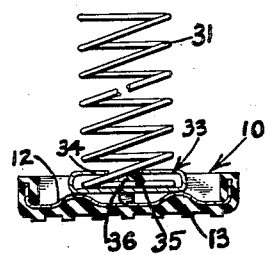
Fig. 3 is an enlarged, cross-sectional view taken along the plane III—III of Fig. 1.

In accordance with this invention I secure the spring means 30 to the bottom surface of the auxiliary pedal. The spring means consists of two vertical coil springs 31 and 32 depending downwardly from the bottom surface of the pedal 10. The springs are secured to the plate 12 by a channel-shaped bracket 33 having the overlapping portions 34 defining the slot 35. The end convolutions of the springs 31 and 32 are seated in the channel-shaped bracket 33 and held in place by the overlapping portions 34. (Fig. 3.) This arrangement securely supports the springs 31 and 32 but still permits them to be slid along the longitudinal axis of the pedal 10 for adjustment purposes. The channel-shaped bracket 33 is secured to the plate 12 by the screws 36 (Fig. 3).

The springs 31 and 32 are preferably of different rigidity, that is, one is more resistant to compression than the other. Preferably the spring 32 is more rigid and resistant to compression than spring 31, however, it is conceivable in accordance with the principle of this invention to vary the relationship between the rigidities of the springs. The only requisite is that the combined springs provide progressively greater resistance at predetermined positions of the pedal 10. For example, in rest or no-throttle position the resistant force created by springs is less than at a second predetermined position, for example, at 35 miles per hour. At a third predetermined position, say at 65 miles per hour, the springs exert an even greater resistance to the pedal. Therefore, in the speed range 0 to 35 the operator of the vehicle has a different feel from the pedal 10 than at speeds exceeding 35. At positions of the pedal where the vehicle is at a speed of 65 miles per hour, the operator has a different feel from the pedal 10 than he has at positions where the vehicle is traveling at less than 65 miles per hour. This relationship between the springs will be explained in more detail in "Operations."

Figure 4:
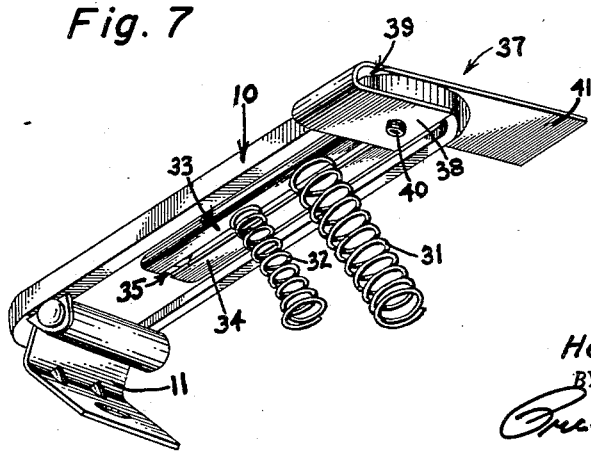
Fig. 4 is an oblique view of the pedal of this invention illustrating the bottom surface of the pedal and the connection of the springs to the pedal.

The main pedal is almost identical to the auxiliary pedal 10. It however is connected through a throttle actuating rod 22. The two pedals 10 and 12 are connected together by the actuating plate 37 which consists of a plate having a bent over portion 38 forming a channel 39 for receiving the end of the pedal 10 (Fig. 4).

Figure 2:
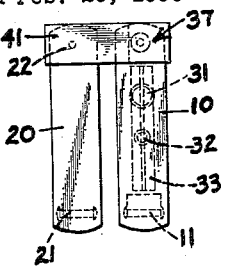
Fig. 2 is a plan view illustrating the arrangement of the auxiliary pedal in relation to the main pedal.

The actuating plate is secured to the pedal 10 by the screw 40 extending through the bent over portion 38 and bearing against the bottom surface of the pedal 10. Plate 37 has a free end 40 extending over the adjacent main auxiliary pedal 20 (Fig. 2). Thus, actuating the pedal 10, also actuates the pedal 20. However, the pedal 20 can be actuated without actuating the pedal 10. This is important as will be explained hereinafter. The modification shown in Figs. 5, 6, 7 and 8 is very similar to that described above. In this particular case rather than providing an auxiliary pedal the springs 31a and 32a are secured directly to the bottom surface of the main auxiliary pedal 20a. This main auxiliary pedal 20a is pivotally secured to the floor 50 of the vehicle by the bracket 21a. This modification is especially adapted for installation at the factory whereas the modification previously described is adapted for installation on vehicles having the conventional accelerator pedal. It is possible, however, to install the springs 31 and 30a on a conventional pedal thus eliminating the auxiliary pedal altogether. The only prerequisite in this modification is that the springs when fully compressed permit full speed of the vehicle.

Operations

Figure 5:
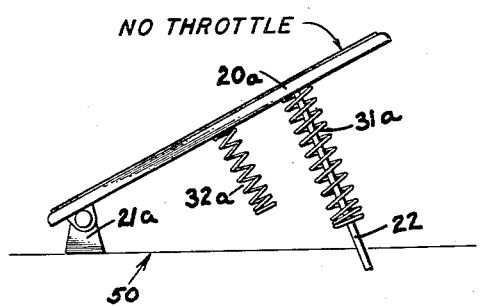
Figure 6:
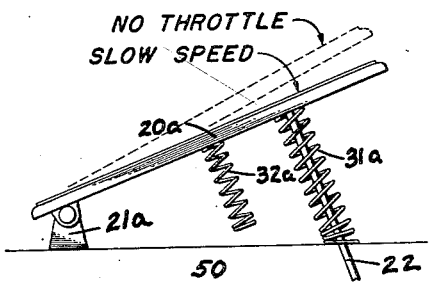
Figure 7:
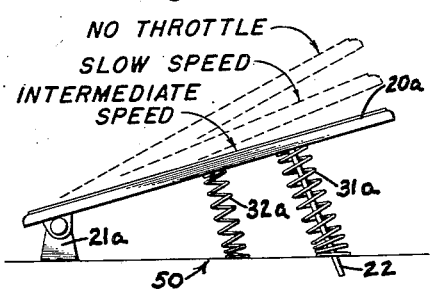
Figure 8:
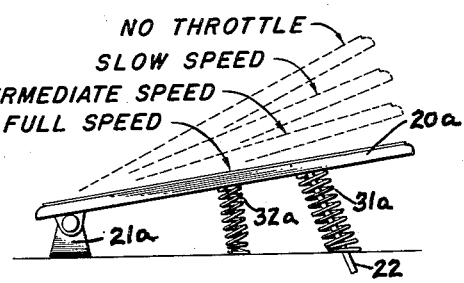

The operation of the two modifications is almost identical. Therefore, to more clearly illustrate its operation reference is made to Figs. 5, 6, 7 and 8. Fig. 5 shows the accelerator pedal in no-throttle position. In this position the only resistance to the pedal is created by the spring located beneath the floor 50. Therefore the operator in initially actuating the pedal 20a feels only the resistance of the conventional spring beneath the floor 50. This resistance is substantially the same throughout the actuation until the free end of the spring 31a strikes the floor as shown in Fig. 6. At that point the spring 31a provides an additional resistance to the pedal. This resistance is sufficiently great to provide a distinct difference between the resistance at no-throttle position and the resistance at slow speed position. The position of the free end of the spring 31a with respect to the floor 50 determines the exact slow speed at which more resistance is felt by the operator. From the slow speed position to the intermediate speed position (Fig. 7) the feel of the accelerator is substantially the same. However, at the intermediate speed position the spring 32a strikes the floor providing an additional distinct resistance to the throttle. This distinct difference in resistance indicates that the intermediate speed has been reached. From intermediate speed position to full speed position (Fig. 8) the resistance is substantially the same. It is obvious that in order to provide a safe device which will permit full speed for passing or otherwise it is necessary that the springs permit the pedal 20a to be pushed all the way down to full speed position.

In accordance with this arrangement, it should be evident that the operator in applying pressure to the pedal becomes accustomed to the different resistances exerted by the springs at different positions of the accelerator pedal.

Thus he can determine when the vehicle is traveling in the slow to intermediate speed range and from the intermediate to full speed range. In accordance with this invention the springs are arranged so that the slow speed is at the speed limit in villages and towns and intermediate speed is the speed on the open highways. Thus the operator can determine whether he is within the speed limit without glancing at a speedometer. As a result the hazard encountered by frequent glances at the speedometer is eliminated.

The above described operation applies to both of the modifications previously described. The modification shown in Figs. 1, 2, 3 and 4, however, is slightly different although the principle is the same. In this modification there are two pedals 10 and 20, pedal 20 being the main accelerator pedal. In this case pressing downwardly on pedal 10 actuates pedal 20 and the operator gets the same response from pedal 10 as he does from pedal 20a as previously described. The modification of Figs. 1, 2, 3 and 4 eliminates the danger of the springs preventing the pedal from being pushed down in full speed position. The auxiliary pedal actuates the main accelerator pedal but the main pedal can be actuated without actuation of the auxiliary pedal. This is accomplished by the actuating plate 37 unattached to pedal 20 at its free end 40. Thus the operator of a car can push on the pedal 20 at a spot below the plate 37 and thus push the pedal 20 entirely down to full speed position. The operator keeps his foot on the pedal 10 until he desires a full speed position, in which case he moves his foot to the pedal 20 and actuates it alone. If the springs are arranged to be fully compressed at the intermediate speed, i. e. the posted speed limit, a positive governor is provided. The point at which spring 32 contacts the floor would then indicate the slow speed. Thus, there are three positions—the no-throttle position where spring 31 contacts the floor (Fig. 1); the slow-speed position where spring 32 first contacts the floor 50; and the intermediate-speed position where either one or both of the springs are compressed thus preventing the pedal from being pushed down any further.

It should be obvious that once the principle of this invention has been disclosed that numerous types of spring arrangements can be developed to give different speed ranges. The use of dual springs is not an absolute requirement. A greater or lesser number may be provided. The positions of the springs can be varied to give distinctly different resistances at different positions. For example, spring 31 could always contact the floor and the position of the pedals at which spring 32 first contacts the floor could determine the open highway speed limit, in which case only one distinct change in the feel of the pedals is noted and only one speed is determined. It is even possible to use leaf springs rather than helical coil springs.

In the preferred form of this invention the coil springs are secured to the bracket 33 making possible the adjustment of these springs along the longitudinal axis of the pedal. Thus the positions of the pedal at slow speed, intermediate speed, and full speed can be adjusted by sliding the springs in the bracket 33. This is a very simple operation requiring no special tools. It should be obvious that the arrangement shown in Fig. 4 could also be used in Figs. 5, 6, 7 and 8 in which case the springs 31a would not be wrapped around the accelerator rod 22.

Various modifications and embodiments of this invention have been described and illustrated. Other embodiments have been recognized. It should be understood, however, that several other modifications and embodiments can be used without departing from the scope of this invention. Therefore, this invention should only be limited as expressly provided in the appended claims.

I claim:

1. A pedal having top and bottom surfaces; an elongated bracket secured to said bottom surface along the longitudinal axis thereof; said bracket being channel-shaped and having bent flanges spaced from extending over its bight portion; and a plurality of different length helical springs each having its end convolutions fitted into the channel and held therein by said bent flanges.

2. In combination with an accelerator pedal mounted to the floor and operatively connected to the carburetor of a motor vehicle; a second pedal arranged along side said accelerator pedal; an elongated bracket secured to said bottom surface along the longitudinal axis thereof; said bracket being channel-shaped and having bent flanges spaced from and overlapping its bight portion; and a plurality of different length helical springs each having their end convolutions fitted into the channel and held therein by said bent flanges, and an actuating plate rigidly secured to said second pedal and extending over said accelerator pedal whereby actuation of said second pedal actuates said accelerator pedal and said accelerator pedal is permitted to be actuated exclusive of said second pedal.

3. In combination with an accelerator pedal for a motor vehicle, said pedal being adapted to be mounted at an angle to the floor of a vehicle; a plurality of helical springs secured to the bottom surface of said pedal and spaced longitudinally of said pedal; one of said springs being adapted to exert a resistant biasing force upwardly against the pedal at a predetermined pedal position; the other of said springs being adapted to exert an additional biasing force at a different position of said pedal whereby an operator of said motor vehicle can sense the vehicle's speed which is dependent upon the position of said pedal; said springs being adjustably mounted in a channel-shaped bracket extending longitudinally of said pedal, each spring having its end convolution held in said channel by flanges spaced from and overlapping the bight portion of said channel.

References Cited in the file of this patent

UNITED STATES PATENTS

| | | |
|---|---|---|
| 2,349,742 | Macavoy | May 23, 1944 |
| 2,352,446 | Pointer | June 27, 1944 |
| 2,735,312 | Howard | Feb. 21, 1956 |

FOREIGN PATENTS

| | | |
|---|---|---|
| 362,495 | Germany | Oct. 28, 1922 |